April 5, 1932.  J. J. MISCERA  1,852,818

AUTOMATIC STARTER FOR MOTOR VEHICLES

Filed Jan. 24, 1930

INVENTOR:
James J. Miscera
BY David E. Carlsen
ATTORNEY.

Patented Apr. 5, 1932

1,852,818

UNITED STATES PATENT OFFICE

JAMES J. MISCERA, OF ST. PAUL, MINNESOTA

AUTOMATIC STARTER FOR MOTOR VEHICLES

Application filed January 24, 1930. Serial No. 424,917.

My invention relates to an automatic starting device for automobiles.

The main object is to provide a simple, inexpensive and efficient device of the class mentioned and applicable to all makes and types of motor vehicles in which the motor is an internal combustion type engine. Further objects and the operation and usefulness of my device are hereinafter fully set forth, reference being had to the accompanying drawings illustrating my device in a preferred construction and mounting and in which,—

Figures 1, 2, 3:
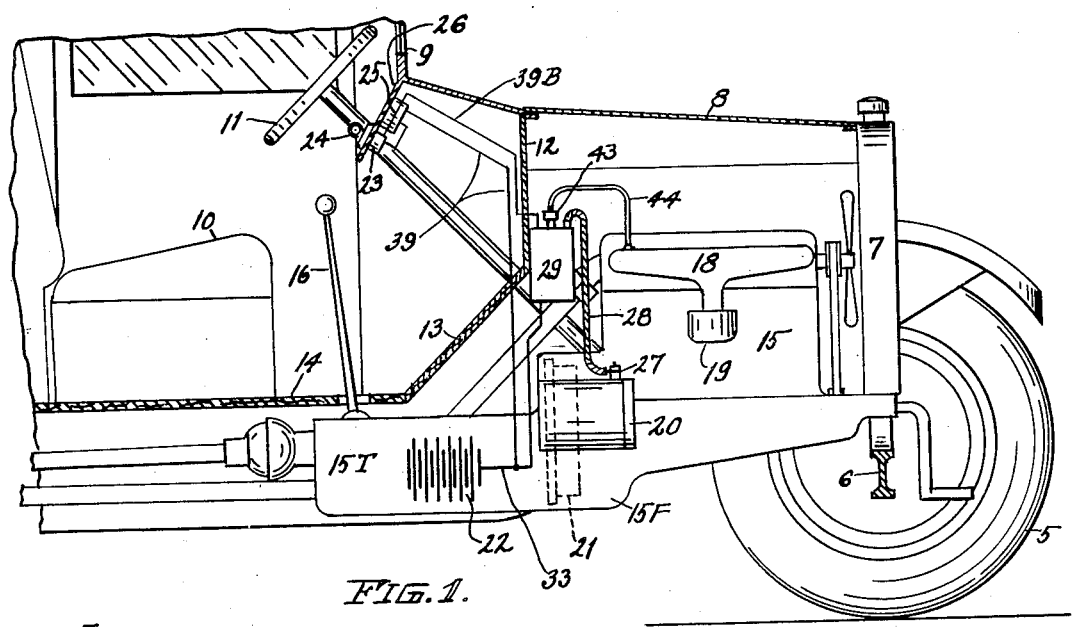
Fig. 1 is a right side elevation of approximately the front half of an automobile with the hood and body parts in longitudinal sectional elevation to expose my device in operative position.
Fig. 2 is a schematic view including a wiring diagram and the mechanism housing of my device partly in section.
Fig. 3 is a vertical transverse sectional elevation through the main circuit closing means of the mechanism housing about as on line 3—3 in Fig. 2 and in enlarged scale.

Referring to the drawings by reference numerals. I have illustrated my device mounted within an automobile, in the electric circuit thereof, as best shown in Fig. 1 in which 5 is a front left wheel, 6 the front axle, 7 the radiator, 8 the hood, 9 the windshield, 10 the driver's seat, 11 the steering wheel, 12 the dash, 13 the foot-board, 14 the floor and 15 is the engine mounted longitudinally between the radiator and the dash. 15F is the usual fly wheel housing rearwardly of which is the usual transmission housing 15T from which extends upwardly the gear shift rod 16. Clutch and brake levers common to all automobiles are omitted, but the parts thus far described are shown in approximately correct relative positions and proportions to facilitate description and a thorough understanding of my device.

Further, parts of an automobile more directly involved in the use of my device are, 18 the fuel intake manifold on the engine block and drawing fuel from the carbureter 19. 20 is an electrically operated starter mounted on the rear and side part of the motor 15 and having gear connection of any well known design with the fly wheel 21 of the engine, within housing 15F, and said fly wheel shown dotted in Fig. 1. Circuit is closed to said starter usually by a press button (not shown) in the floor board and in circuit between the usual storage battery 22.

My device requires certain changes in these circuit closing means presently to be described. 23 (Fig. 1) illustrates the usual circuit closing switch of which 24 is the key and 25 is an ammeter (Figs. 1 and 2) also in circuit, both said parts 24—25 being suitably mounted in accessible position as on the usual instrument board 26 of a car. 27 is a cable terminal post on the starter 20 and 28 is a cable connected thereto and through which circuit closing means of my device controlled directly at the switch 23 and through further circuit means connected to the battery cause the starter to operate as will now be described.

The mechanism housing of my device may consist of a two-compartment box 29 divided by a vertical wall 29W, making compartments A and B. In one of the latter as A, in its upper part, is fixed a casting 30, the upper part of which has a vertical large bore 30A and below this a smaller concentric bore 30B in which is reciprocable the shank of a vertically disposed circuit closing plunger 31, the lower end of which has an enlarged head 31H in spaced relation to the bottom 29B of the housing. 32A and 32B are two spaced contact posts fixed on bottom 29B, of which 32A is connected to a primary circuit wire 33 with the battery 22.

34 is a wire connected to 32B and extending to a fixed contact member 35 in the lower part of compartment B (see Fig. 2). 36 is a counterpart of 35 and fixed on the lower end of a vertically fixed spring arm 37 secured in the top 29T of the housing and extending above said top, said exposed upper end of the arm 37 being connected to the cable 28 (as at 37C, Fig. 2) which leads to the starter. Normally the members 35—36 are in spaced relation to each other but act as cooperative circuit closing means when drawn together by a magnetic coil 38 fixed in compartment B near the arm 37. The initial or main circuit closing takes place when circuit is completed through post 32A, head 31H of the plunger 31, post 32B, wire 34 to member 35, but it is obvious that the circuit is not complete to the starter until members 35 and 36 are in contact, and the latter does not take place until the coil 38 is energized by secondary circuit means which will now be described.

39 is a secondary circuit wire leading from cable 33 to ammeter 25, thence to switch 23. 39A is the usual wire from switch 23 to the coil and distributor (not shown) of an automobile. 39B is a wire from switch 23 to the magnetic coil 38 of my device. Manipulation of key 24 controls current through circuit wires 39A and 39B.

It will now be readily seen that when secondary circuit is closed through switch 23 and to the coil 38 the circuit closing parts 35—36 in the primary circuit cause the starter to operate and turn the crank shaft of the engine, the ignition circuit being simultaneously closed. The circuit closing at 35—36 is of course subject to circuit-closing action through parts 32A, 31H and 32B. This latter action is controlled by the reciprocating action of the plunger which in turn is controlled by the suction action of the engine, as will now be described.

In Fig. 3 the plunger 31 is shown suspended (in full lines) with its head 31H in spaced relation above members 32A and 32B, and in dotted lines said head is shown in contact on said members in lowered position. The upper end of shank 31 is bored as 31B, said bore closed by a plug 31P drilled centrally as 31D to slidably receive a piston rod 40R of a piston 40 reciprocable in bore 30A and under the top 29T, said piston rod having a head 40R' within bore 31B. Concentric of bore 30A the top 29T has an outlet 41 to a ball chamber 42C in a permanent pipe 42 to the upper end of which is connected at 43 a pipe 44 extending to and communicating with the interior of the intake manifold 18 (see Fig. 1). 45 is a compression coil spring between piston 40 and head 29T of the housing and 46 is a like but smaller spring within bore 31B and bearing upwardly against the piston rod head 40R'. 47 is a ball in chamber 42C and normally closing passage 41.

In the use of my device when a driver wishes to start the engine of a car equipped as described, and assuming that plunger 31 is down with its head 31H in contact with both fixed contacts 32A and 32B, he first inserts key 24 in the switch and turns same to close circuit through wire 39, thence through 39A and 39B respectively to the ignition and to the magnetic coil 38 simultaneously. The energized coil immediately causes closing of the primary circuit through contacting parts 35—36, arm 37 and cable 28 to the starter. The starter immediately rotates the crank shaft causing suction in the compression chambers of the engine which of course creates suction in the manifold 18 and pipe 44. The latter action raises ball 47, creates a partial vacuum in bore 30A, raising piston 40 slightly, against the action of spring.

As the ignition takes effect in the engine its speed is of course increased causing increased suction in pipe 44 and semi-vacuum in chamber 30A moving piston 40 upwardly still further until head 40R' of the piston rod engages and lifts the shank 31 and head 31H is drawn upwardly away from posts 32A—32B and opening circuit. The starter is then immediately put out of action and remains inactive until the engine stops or the switch 23 is shut off.

It will now be readily seen that suction caused by the engine raises piston 40 only gradually at first and the piston does not raise the plunger 31 with its circuit closing head until the ignition takes effect in the engine and causes increased speed which of course creates greater suction in chamber 30A and then the plunger is raised quickly to break circuit to the starter as the latter should at this time become inoperative.

The usefulness of my starter device will now be more readily understood. If it be assumed that the engine should stop suddenly because of improper fuel mixture or the engine being cold or for any other reason, it is obvious that suction in pipe 44 leading to my mechanism housing, ceases. Immediately the cylinder 40 goes down and it in turn pushes plunger rod 31 downwardly and head 31H closes circuit to the starter as described and the engine is again started as described, this action being automatic as long as the switch 23 is on and as often as the engine stops. Its action is limited only by the current available. Besides the regular function of my starter device its automatic feature is invaluable. As an emergency device it is also automatically in service, for example, if the fuel supply is unexpectedly exhausted the starter device will automatically keep the engine in motion and a driver can proceed under this temporary power means, to a location out of danger. This latter feature is particularly valuable for cars that become stalled on railway or street crossings or other dangerous places.

The mechanical and electric means of my device have been illustrated in a preferred embodiment thereof and in a form found to be practical but it is obvious that variations in construction may be made without departing from the scope and spirit of the invention. In Fig. 3, 48 is a small spring pressed ball in a bore of casting 30 and bearing yieldingly in an exterior groove 31G on shank 31 to normally help hold the plunger device elevated with head 31H in spaced relation to the contacts 32A—32B.

I claim:

1. The combination with the starting mechanism circuits of the engine of a motor vehicle, of an automatic circuit closing device adapted to cause open circuit while the engine is running, said circuit closing device comprising a vertically reciprocable plunger located above a pair of fixed circuit contacts, a piston in a fixed cylinder above said plunger and operatively connected with the latter, conductor means connected to said engine and said cylinder to create a suction, and hold the piston and plunger in suspension while the engine is operating, said contacts arranged to be contacted simultaneously by said plunger when suction ceases and the plunger gravitates to said contacts to close circuit to the starting mechanism, said piston having a limited free reciprocal movement with relation to the plunger.

2. The structure specified in claim 1, in which said plunger is provided with an upper central bore, said piston formed with a downwardly directed stem projected into said bore, a head on said lower end of the stem and arranged to engage the plunger while moving upwardly only and after a predetermined upward movement of its piston.

3. The structure specified in claim 1 and a gravity actuated ball valve arranged in the line of suction and adjacent said cylinder, and cushioning means within said cylinder above the piston, and like cushioning means within said bore of the plunger between said head of the piston stem and the inner end of the bore, said cushioning means consisting of helical coil springs under compression.

In testimony whereof I affix my signature.

JAMES J. MISCERA.